(12) United States Patent
Thurn et al.

(10) Patent No.: US 11,465,538 B2
(45) Date of Patent: Oct. 11, 2022

(54) CHILD SAFETY SEAT FOR ATTACHING TO A MOTOR VEHICLE SEAT

(71) Applicant: CYBEX GmbH, Bayreuth (DE)

(72) Inventors: Christoph Thurn, Bayreuth (DE); Thomas Müller, Bayreuth (DE); Florian Scharff, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 15/733,305

(22) PCT Filed: Dec. 14, 2018

(86) PCT No.: PCT/EP2018/085033
§ 371 (c)(1),
(2) Date: Jun. 22, 2020

(87) PCT Pub. No.: WO2019/121413
PCT Pub. Date: Jun. 27, 2019

(65) Prior Publication Data
US 2020/0384900 A1 Dec. 10, 2020

(30) Foreign Application Priority Data
Dec. 22, 2017 (DE) .................... 20 2017 107 887.6

(51) Int. Cl.
*B60N 2/28* (2006.01)
*B60N 2/427* (2006.01)

(52) U.S. Cl.
CPC ......... *B60N 2/2884* (2013.01); *B60N 2/2842* (2013.01); *B60N 2/2851* (2013.01); *B60N 2/42709* (2013.01)

(58) Field of Classification Search
CPC ............... B60N 2/2884; B60N 2/2842; B60N 2/22851; B60N 2/42709
(Continued)

(56) References Cited

U.S. PATENT DOCUMENTS

| 8,931,836 B2 | 1/2015 | Cheng et al. |
| 2004/0232743 A1 | 11/2004 | Fujita et al. |

(Continued)

FOREIGN PATENT DOCUMENTS

| AU | 2011200689 A1 | 9/2011 |
| CN | 101434208 A | 5/2009 |

(Continued)

OTHER PUBLICATIONS

"International Application No. PCT/EP2018/085033, International Search Report and Written Opinion dated Mar. 29, 2019", (Mar. 29, 2019), 10 pgs.

(Continued)

*Primary Examiner* — Anthony D Barfield
(74) *Attorney, Agent, or Firm* — Schwegman Lundberg & Woessner, P.A.

(57) ABSTRACT

A child seat for mounting on a motor vehicle seat is comprised of at least one contact surface device for a child accommodated in the child seat, the contact surface device having at least a first section and a second section, the second section being transferable relative to the first section from a first position to a second position by the action of an at least partially outwardly directed force acting on the second section to damp deceleration of the child in the case of a displacement of the child towards the second section.

16 Claims, 8 Drawing Sheets

(58) Field of Classification Search
USPC .................................................. 297/216.11
See application file for complete search history.

(56) References Cited

U.S. PATENT DOCUMENTS

| | | | |
|---|---|---|---|
| 2009/0121400 A1 | 5/2009 | Schrooten et al. | |
| 2010/0295342 A1 | 11/2010 | Marsden et al. | |
| 2010/0295347 A1* | 11/2010 | Marsden | ................ 297/216.11 |
| 2013/0062917 A1 | 3/2013 | Powell | |
| 2015/0336482 A1 | 11/2015 | Pos | |
| 2016/0001681 A1 | 1/2016 | Pos | |

FOREIGN PATENT DOCUMENTS

| | | |
|---|---|---|
| CN | 103042954 A | 4/2013 |
| CN | 204161169 U | 2/2015 |
| CN | 105235556 A | 1/2016 |
| CN | 107089172 A | 8/2017 |
| DE | 102015113836 A1 | 2/2017 |
| JP | 2000142194 A | 5/2000 |
| JP | 2010531274 A | 9/2010 |
| JP | 2016013831 A | 1/2016 |
| WO | WO-2011054063 A1 | 5/2011 |
| WO | WO-2014053009 A1 | 4/2014 |
| WO | WO-2017029272 A1 | 2/2017 |
| WO | WO-2019121413 A1 | 6/2019 |

OTHER PUBLICATIONS

"International Application No. PCT/EP2018/085033, International Preliminary Report on Patentability dated Jul. 2, 2020", 7 pgs.
"European Application No. 18826564.9, Communication pursuant to Article 94(3) EPC dated Aug. 11, 2021", (Aug. 11, 2021), 8 pgs.
"Chinese Application No. 201880088576.4, First Office Action dated Mar. 22, 2022", (w/English Translation), 15 pgs.
"Japanese Application Serial No. 2020-533195, Office Action dated Apr. 26, 2022", (w/ English Translation), 14 pgs.

* cited by examiner

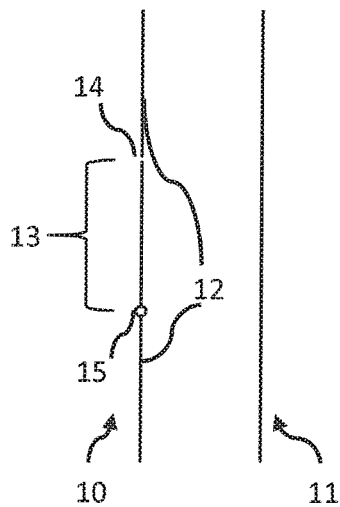
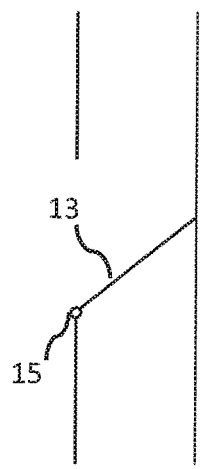
Fig. 2    Fig. 3
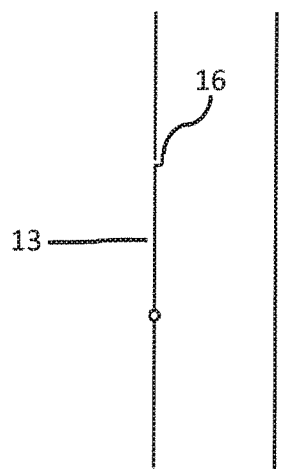
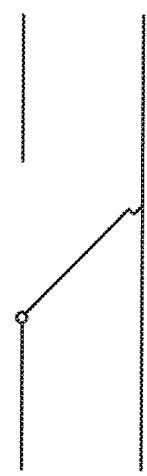
Fig. 4    Fig. 5

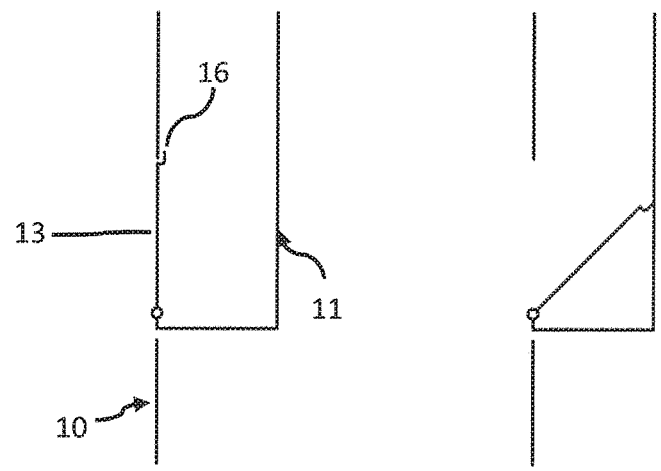
Fig. 6  Fig. 7
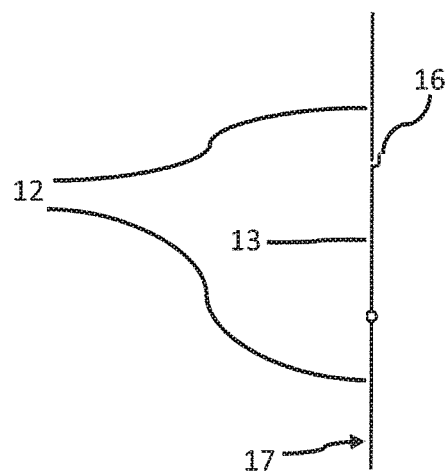 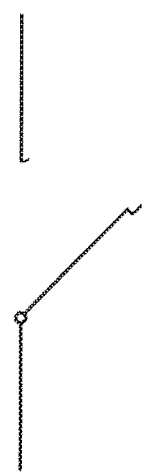
Fig. 8  Fig. 9

CHILD SAFETY SEAT FOR ATTACHING TO A MOTOR VEHICLE SEAT

PRIORITY CLAIM TO RELATED APPLICATIONS

This application is a U.S. national stage filing under 35 U.S.C. § 371 from International Application No. PCT/EP2018/085033, filed on 14 Dec. 2018, and published as WO2019/121413 on 27 Jun. 2019, which claims the benefit under 35 U.S.C. 119 to German Application No. 20 2017 107 887.6, filed on 22 Dec. 2017, the benefit of priority of each of which is claimed herein, and which applications and publication are hereby incorporated herein by reference in their entirety.

DESCRIPTION

The invention relates to a child seat for mounting on a motor vehicle seat according to claim 1.

In the state of the art, child seats for mounting on a motor vehicle seat are generally known. Such child seats have a contact surface device for accommodating a child in the child seat. This contact surface device may, for example, be defined by a side wall and/or a rear wall.

In general, such a contact surface device is provided to hold the child safely, ergonomically and comfortably and to serve as a barrier against elements that may move (relatively) towards the child and injure it, for example during an accident.

At the same time, it may happen that a child (or a part of the body) restrained in the child seat moves, for example, during an accident, relative to the contact surface device and then be caught by the contact surface device. In such a case, it is desirable that the deceleration of the child (or part of the child's body) caused by the restraint is limited to tolerable levels in order to avoid or at least reduce injuries. To this end, standard child seats have a cushioning structure, e.g. padding, in many areas, for example in the form of textile inserts and/or soft foams and/or rigid foams (EPS, EPP, etc.). In addition, a shell of most child seats is made of a plastic material which may have certain spring properties, wherein the contact surface device(s) may be part of the shell(s).

For various reasons, the solutions in the state of the art are considered to be disadvantageous. For example, the elastic properties of the shells may be designed to be only quite weak, since the shell must simultaneously protect against external influences. A padding, on the other hand, must be comparatively soft to be comfortable for the child held in the child seat. Generally advantageous padding, such as hysteresis foams or spacer fabrics, are comparatively expensive. Rigid foams, on the other hand, can be damaged when subjected to comparatively high forces and then have to be replaced or offer only reduced safety.

Therefore, it is an object of the invention to limit in a simple manner a deceleration of the child produced when the child is caught by a contact surface device.

This object is solved by a child seat according to claim 1.

In particular, the object is solved by a child seat for mounting on a motor vehicle seat, the child seat having at least one contact surface device for a child accommodated in the child seat (for accommodating the child or a part of the child's body), the contact surface device having at least a first section and a second section (damping section), wherein the second section is transferable relative to the first section from a first position into a second position by the action of a force which is directed at least partially outwards and acts on the second section for damping a deceleration of the child in the event of displacement of the child towards the second section.

A key aspect of the invention is that the second section (damping section) is designed to limit a deceleration of the child (for example in an impact situation). This makes it possible to prevent (or at least reduce a corresponding risk) in a comparatively simple manner that the child injures itself due to excessive deceleration. In all, this improves safety.

Basically, it should be noted that, in the context of this invention, the term "child seat" is to be understood as a generic term for "classical" child seats and infant carriers. In this respect (unless otherwise stated in the specific context), child seat is always to be understood as an abbreviated form of "child seat, possibly infant carrier", or, within the scope of this invention, features intended for a child seat are in principle also applicable to an infant carrier and vice versa (unless otherwise stated to the contrary). The same applies to the term "child", which is also to be understood as a generic term for children and babies and infants. So-called "infant carriers" often comprise (only) a one-piece shell to accommodate the baby or child and may include a separate belt system, optionally a head rest and other components as appropriate. Instead of a (structurally separate) backrest, such "infant carriers" have a back section adjoining a "seating area" in which the child's buttocks can be accommodated. Child seats for larger children, on the other hand, usually have a backrest that is structurally separated from a seat area, the angle of which optionally can be varied in relation to the seat area. The structural demarcation can be formed, for example, by a kink or similar.

A contact surface device is understood to be in particular a contact surface element. This can (but does not have to) be designed in one piece (monolithic). The first section and/or second section can each be constructed individually and/or in its entirety in one piece (in particular monolithic) or in several parts (as separate parts). A thickness of the contact surface device (the contact surface element) and/or the first section and/or the second section should preferably be at least essentially constant. A maximum thickness can, for example, be less than/equal to 3 times, more preferably less than/equal to 2 times, more preferably less than/equal to 1.2 times a minimum thickness. A surface of the second section (in particular the inner surface or the surface facing inwards with respect to the child seat, i.e. facing the child) may be at least 5 cm$^2$, preferably at least 10 cm$^2$ and/or at most 500 cm$^2$, preferably at most 200 cm$^2$.

The second section may also be referred to as effective area, in particular effective area element and/or as damping area, in particular damping area element. The first section may be the complete contact surface device, minus the second section, or a part thereof. If necessary, the first section completely surrounds the second section (at least in the first position or rest position).

A surface (especially an inner surface or a surface pointing inwards) of the first section is optionally larger than a (especially inner) surface of the second section. A (especially inner) surface of the first section is preferably at least 20 cm$^2$, more preferably at least 40 cm$^2$ and/or at most 5,000 cm$^2$, preferably at most 3,000 cm$^2$. The contact surface device (the contact surface element) may form a rear and/or side wall or be part of a rear wall and/or side wall.

A transfer from a (first) position to another (second) position means in particular that the second section (relative to the first section) is changed in terms of its position and/or orientation in space. A change of position is in particular a displacement of a centre of gravity of the respective section.

In this sense a (pure) deformation is basically not to be regarded as a transfer from a (first) position to another (second) position. The "second" position is a different position from the "first" position. The "second position" need not be fixed and is preferably dependent on the force acting outwards, if necessary up to a predetermined maximum second position. The "second position" is in particular a position of the second section which is at least partially shifted outwards in relation to the first position. When the second section is displaced, the first section is preferably not or only slightly displaced (relative to a centre of gravity of the child seat).

An at least partially outwardly directed force shall be understood to mean a force which is directed (at least component-wise) from an interior of the child seat (i.e. an accommodation space for the child) to the outside.

In particular, the statement of purpose "for damping a deceleration of the child" implies that the sections (the first and second sections) must be configured and arranged so that the damping function can be realised. In particular, this implies that a force can be applied to the second section by displacement of the child within the accommodation space. This would be impossible, in particular, if there would still be a structure between the second section and the child (in the case of displacement) which would prevent this.

In general, the term "contact surface device" (or contact surface element) does not exclude the presence of other structures between the child and the contact surface device (or contact surface element), in particular a padding, as long as this does not prevent a force from being exerted on the second section by the child's displacement, which in turn can be damped by the configuration of the second section (relative to the first section).

The contact surface device (the contact surface element) can be defined in particular by a seat shell and/or headrest.

First and/or second section are preferably structurally delimited or demarcated, for example by a border and/or a fold line (or other, in particular articulated or jointed, demarcation).

Preferably, in the second position compared to the first position, a distance between at least a first border section of a border of the second section on the one hand and the first section (or an adjacent first border section of a border of the first section, respectively) on the other hand is increased. The distance is preferably less than 2 cm in the first position, more preferably less than 1 cm, in particular (at least essentially) equal to 0 cm. Furthermore, in a second position, the distance can be more than 1.5 cm, preferably more than 5.0 cm, at least in sections. By a first border section of a border of the second section is meant in particular a section of the border of the second section which is movable relative to the first section or is not fixedly connected therewith. Depending on the geometry of the corresponding border section, it may be that individual points on the border section experience a more or less pronounced increase in distance. In this respect, an increase in distance is achieved thereby so that a distance increase takes place at least for at least 50% of the points of the considered border section. This increase in distance does not have to be the same for all points. Insofar as specific (e.g. minimum or maximum) values are specified for the "distance", this is preferably understood to mean the distance that results when all points on the considered border section of the border of the second section are evaluated with regard to their distance to the next point on the first section. The largest value resulting from this evaluation should then be interpreted as "distance". If, for example, in the first position, a first number of points on the first border section of the wall of the second section have a distance of 1 cm to the nearest point on the first section and a second group have a distance of 2 cm, the value of 2 cm is preferably used.

In general, in particular the second section (damping section or damping area) has a border, the first border section of the second section being formed by a delimitation of the second section (damping or effective area) from the surrounding (remaining) contact surface device. Preferably a second section of the border is formed by a transition to the surrounding (remaining) contact surface device.

In a specific embodiment, the transfer from the first position to the second position is reversible. Preferably, the second section (the damping area) is returned from the second position to the first position as soon as no more force is applied or as soon as a certain force threshold is deceeded. In general, the return movement is therefore preferably self-acting (automatic). However, it is also possible that such a returning requires corresponding action (e.g. manually).

The second section is preferably designed as a flap (impact flap).

In specific embodiments, the second section can be swiveled in relation to the first section, in particular it is designed as a pivoting flap. Alternatively or additionally, the second section can be movable in translation in relation to the first section, optionally it can be designed as a translationary movable flap. In particular, a superimposed rotational-translational movement is also conceivable, wherein the skilled person knows the appropriate means for this (such as slide guides, curved contact surfaces etc.).

The second section is designed at least in sections as a spring, especially a leaf spring, (or includes such a spring, in particular a leaf spring). Alternatively or additionally, the second section can be spring-mounted, in particular by means of a coil spring. In this way an optional automatic return to the first position can be made possible. Furthermore, this can be used to create a pre-tension which counteracts the force due to the displacement of the child (especially in interaction with the blocking device described below). Altogether, safety is improved in a simple way.

A first position is preferably understood to be a rest position which the second section adopts when either no force is applied at all (due to the displacement of the child) or a certain force threshold is at least not exceeded. A second position shall be deemed to be present if, due to the application of the corresponding force (or exceeding a corresponding force threshold), a displacement or movement (e.g. pivoting and/or translational movement) of the second section with respect to the first section has occurred. Depending on the amount and direction of the force, the second position may vary. In this respect, it is possible that the second position may vary continuously over a certain range (e.g. angular range and/or distance) or, if necessary, in discrete steps (e.g. by a ratchet mechanism or the like).

The contact surface device or the first and/or second section is/are preferably formed from a (at least substantially) dimensionally stable material. A dimensionally stable material is understood in particular to mean that the material resists (at least substantially) external influences (pressures). Alternatively or additionally, the contact surface device or at least the first and/or second section can be formed from an (at least substantially) non-porous or dense material, respectively. A (substantially) non-porous material is preferably a material which has a pore volume of less than 30%, preferably less than 10%, still further preferably less than 5%.

A density of a material of the contact surface device or of the first and/or second section may be at least 200 kg/m$^3$, preferably at least 500 kg/m³, still further preferably at least 800 kg/m³. Furthermore, a thickness of the contact surface device (or at least of the first and/or second section) may be at least 1 mm, preferably at least 2.5 mm, and/or at most 30 mm, preferably at most 15 mm. Insofar as the density fluctuates, a maximum value can be used or a threshold value, above and below of which the density of 50% by volume of a volume under consideration in each case falls. Insofar as the thickness fluctuates, a maximum thickness or a threshold value above and below of which the thickness of 50% by volume of a surface area under consideration falls should preferably be used. In the case of multi-walled, in particular double-walled shells, said values should refer in particular to the inner (innermost) wall (i.e. the contact surface device would then be, in particular, the inner wall of the double-walled or multi-walled structure or part of it).

A material of the contact surface device or of the first and/or second section can be plastic, preferably a thermoplastic plastic and/or a polymer, in particular based on a polyolefin, for example polypropylene, and/or polyamide. In general, all materials suitable for injection moulding are suitable. Alternatively (or additionally), the contact surface device or the first and/or second section can also be (at least partially) made of metal, for example aluminium or an aluminium alloy or steel.

The contact surface device or at least the first and/or second section thereof may be defined by a contact wall. Furthermore, the contact surface device, at least the first and/or second section thereof, may be covered by a padding or other intermediate element (in particular on the inside). The contact wall is preferably defined by a seat shell.

The contact surface device may generally be defined by at least one side wall and/or rear wall. In particular, the above-mentioned contact wall may comprise at least one side wall and/or rear wall.

When transferring from the first position into the second position, a distance between at least a second border section of a border of the second section and the first section (or the adjacent second border section of a border of the first section) may remain the same.

The first section and the second section can be (firmly) connected to each other in sections, in particular at a/the second border section of a border of the second section, preferably formed integrally with each other. Alternatively, first and second sections can also be formed by separate components, in particular components in which each point of both components can be removed from the respective other component.

In the second position, a distance between the entire border of the second section and the first section (or an adjacent border section of a wall of the first section) can be increased, compared to the first position.

The first and second sections may be structurally separated from each other (possibly also in the first position), in particular by a slit and/or cut and/or kink and/or bending section.

The border of the second section may have at least one first straight section, in particular as a polygon, preferably square, more preferably trapezoidal. Preferably, the first straight section is at least in sections permanently connected to the first section, in particular also in the second position, and/or the border of the second section, apart from the first straight section, is at least not permanently connected to the first section, in particular is movable relative to the first section.

Preferably, the second section (the effective area) (in a side view in the first position or resting position) is tapered towards the rear, i.e. narrower in a rear area than in a front area.

Preferably, a lower edge (in particular a lower straight edge) of the (for example square, in particular trapezoidal) second section (effective area) is firmly connected to the first section, in particular in such a way that an (opposite) upper (in particular straight) edge can swivel outwards. This allows forces to be absorbed effectively and safely. Alternatively, also a rear or front or lower (in particular straight) edge can swivel outwards.

The second section is preferably arranged: in the area from the head to (at least approximately) the buttocks of a child to be accommodated in the child seat, in particular a head area of the child seat, for example in an area of the seatback and/or a headrest which is/are designed in particular to accommodate the head of a child accommodated in the child seat, or in the area of side wings of a seat shell or the headrest, in particular at the level of the head.

A maximum offset between the second section and the first section (in the first position) is preferably not more than 10 mm, more preferably not more than 5 mm, still more preferably not more than 2 mm, still more preferably not more than 1 mm. In certain embodiments, the second section may be flush with the first section. An offset means in particular a step which may result from a juxtaposition of the second section and the first section (if necessary). The values just mentioned then indicate in particular the height of this step.

Preferably, a blocking device, in particular a stop, is provided in such a way that a movement of the second section inwards is blocked (i.e. in the direction of the child), the second section in the first position preferably being pressed against the blocking device, for example due to a spring force which can be provided in particular by designing the second section as a spring and/or a resilient mounting of the second section (see above). Such a blocking device makes it possible in particular for the second section to have a pre-tension in the first position, so that a pre-tension force must first be overcome before the second section moves relative to the first section. This makes it easy to define a force threshold above which the second section moves (or begins to move) relative to the first section.

At least one wall of the child seat may be double-walled, the second section preferably being part of an inner wall.

In embodiments, a first border section of the border of the second section is defined by a delimitation (gap; at least in the second position) from the first section (or the surrounding part of the contact surface device). Preferably, a second border section of the border can be formed by a transition to the first section (or to the surrounding part of the contact surface device).

The first and optionally second border section of the border are preferably each associated. The delimitation is preferably structural, for example in the form of a slit or cut or other gap. The transition can be seamless, for example, but it can also be such that the first and second sections form separate components or are part of separate components.

The border of the second section can be curved (at least in sections), in particular in the form of an arc. The second section of the contact surface device may be flat (or not flat).

In embodiments, a transition between the second section and the first section (or surrounding part of the contact surface device) is designed to allow for springing of the second section. This can (in particular if the second section is designed in the manner of a leaf spring) preferably be achieved by selecting a suitable material, for example plastic, as well as a suitable thickness for the transition region (if necessary, for the entire contact surface device including the second section) and by a suitable length of a/the second border section of the border.

In a preferred embodiment, the wall of the second section has exactly one transition section and exactly one delimiting section.

The blocking device (the blocking means) may block movement of the second section inwards (towards the child restrained in the child seat) but may allow movement of the second section (the effective area) outwards (away from the child restrained in the child seat), at any time if necessary. The blocking device (the blocking means) may in particular comprise a stop which, if necessary, is effective in the region of (the entire) first section of the border or at least partial sections thereof. This can effectively prevent that an element acting on the child seat from the outside moves the second section inwards and thereby endangering the head area of a child held in the child seat. The mode of operation is comparable to that of a door (without locking in any of the positions).

Preferably, the contact surface device is defined by a double-walled wall (especially shell) of the child seat. The inner wall preferably forms at least part of the contact surface device, at least in sections. The second section in particular is preferably part of an inner wall of the wall (shell) of the child seat. The second section (effective area) may have exactly one transition section and exactly one delimiting section. The section of an outer wall of the wall (shell) opposite the second section (effective area) should preferably be designed continuous and provide a protective function against elements acting on the child seat from outside. This produces in particular a protected area for the movement of the second section (effective area) so that the intended space is always available for this movement and the movement of the second section (effective area) cannot be restricted from outside.

In a further embodiment, the wall (shell) of the child seat may also be designed double-walled, an inner wall forming at least in sections at least a part of the contact surface device. In particular, the second section (effective area) is preferably part of the inner wall of the shell of the child seat. The second section (the effective area) preferably has exactly one delimiting section and no transition section. A section of the outer wall of the wall (shell) opposite to the second section (effective area) is preferably designed continuous in order to provide a protective function against elements acting on the child seat from outside. The second section (the effective area) is preferably mounted on the outer and/or inner wall at least via an elastic element (for example a spring). This allows a protected area to be formed for the movement of the second section (the effective area) so that the space provided for this movement is always available, wherein the movement of the second section (the effective area) is not restricted from the outside.

In principle, it is possible to couple an actuation (transfer) of the second section to a threshold value (before exceeding it no transfer occurs).

A maximum load capacity of the second section (the effective area)—i.e. the load at which a maximum deflection or displacement is achieved—can be at a force of maximum 3000 Newton or maximum 1500 Newton or maximum 700 Newton or maximum 300 Newton. The maximum load capacity may also be lower, for example a maximum of 100 Newton or 40 Newton or 10 Newton, for example if further measures are taken. Such (further) measures can be, for example, a side impact protection element or a force limitation device. A maximum deflection may be a maximum of 20 cm or maximum of 10 cm or maximum of 5 cm or maximum of 2 cm. A (maximum) deflection is the deflection of that point (or group of points) of the second section which undergoes the greatest change compared to its position in the first position.

From the maximum load capacity and the maximum deflection can result spring constants which can be used for characterization, if necessary.

In particular in the case of embodiments with an inner and an outer wall, the outer wall (e.g. due to weight reduction) may also be formed non-continuous (e.g. frame-like), if, for example, there is no risk of an element penetrating from the outside in an area adjacent to the seatback of a vehicle.

Further embodiments of the invention result from the dependent claims.

In the following, the invention is described by means of embodiments, which are explained in more detail by means of the drawings, in which:

FIG. 2 shows a schematic representation of a detail of a child seat according to the invention in a first position;

FIG. 3 shows the detail according to FIG. 2 in a second position;

FIG. 4 shows a detail analogous to FIG. 2 according to another embodiment in a first position;

FIG. 5 shows a detail according to FIG. 4 in a second position;

FIG. 6 shows a detail analogous to FIG. 2 of a first position according to a further embodiment;

FIG. 7 shows the detail according to FIG. 6 in a second position;

FIG. 8 shows a detail analogous to FIG. 2 according to another embodiment;

FIG. 9 shows the detail according to FIG. 8 in a second position;

In the following description, the same reference numbers are used for identical and equivalent parts.

FIG. 1 shows an oblique view of a child seat according to the invention, in which the contact surface device according to the invention cannot be seen in detail. An area suitable for the formation of the second section (effective area) is marked by a dashed line 9.

Figure 1:
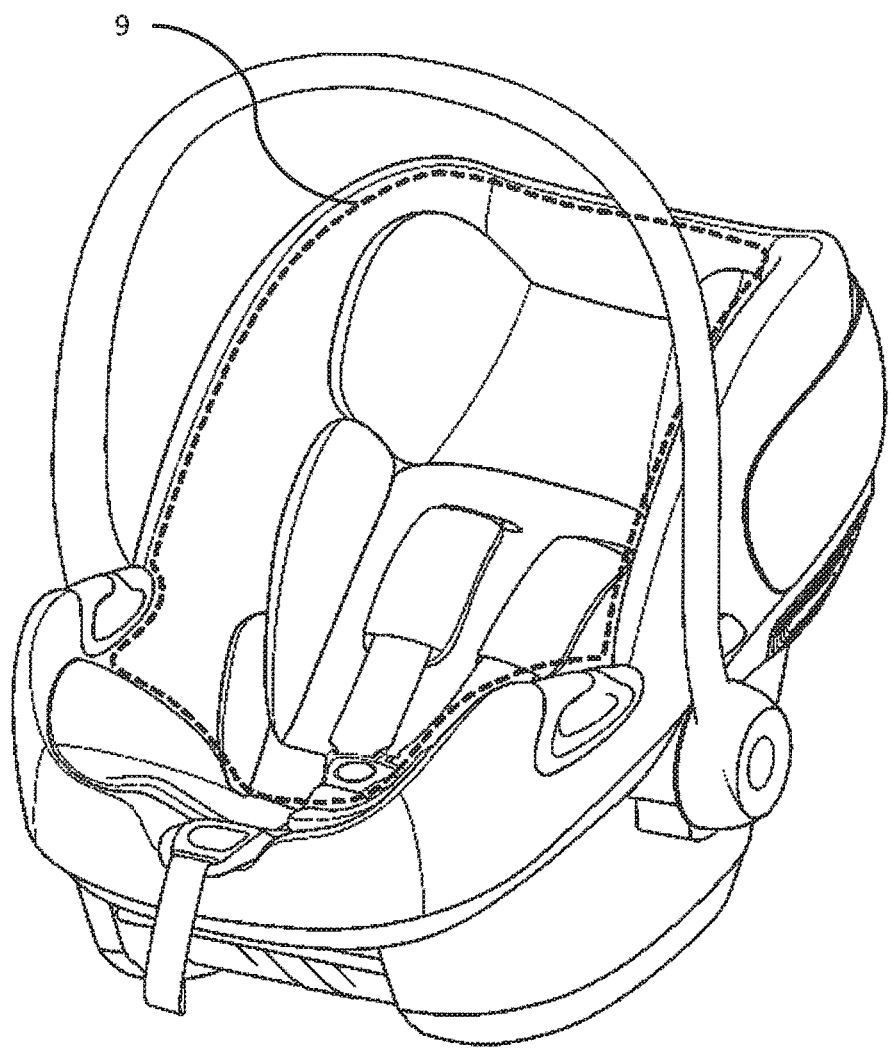
FIG. 1 shows a schematic oblique view of a child seat according to the invention.

FIGS. 2 and 3 show schematically a detail of a wall (shell) of an inventive child seat according to a first embodiment. This embodiment has an inner wall 10 and an outer wall 11. The inner wall 10 in turn has a second section 13 (effective area) and a first section 12. The second section 13 can be moved or pivoted in relation to the first section 12 (see FIG. 3) when an outwardly directing force is applied (in the direction of the outer wall 1). The first section 12 and second section 13 are structurally separated from each other by a delimiting section 14 (not defining a fixed connection) and a transition section 15 (preferably defining a fixed, in this case articulated, connection). In FIG. 2 the second section 13 is in the first position (without force load), in FIG. 3 the second section is in the second position in the state of (maximum) deflection.

The embodiment according to FIGS. 4 and 5 essentially corresponds to the embodiment according to FIGS. 2 and 3, wherein a blocking device (stop) 16 is provided in addition. The blocking device prevents the second section 13 from swiveling inwards if, for example, an object from outside deforms or breaks through the outer wall. If necessary, the blocking device may also enable the second section 13 to have a pre-tension inwards (in the position according to FIG. 4).

The embodiment according to FIGS. 6 and 7 corresponds to the embodiment according to FIGS. 4 and 5 with the difference that the wall here is only doubled in sections, i.e. the outer wall 11 does not extend over the entire inner wall 10. However, according to the embodiment the second section 13 is arranged in the area that is double-walled.

In contrast to FIGS. 2 to 7, FIGS. 8 and 9 show a single-walled wall with only one wall 17, but with a blocking device 16 as in FIGS. 4 and 5.

Figure 10:
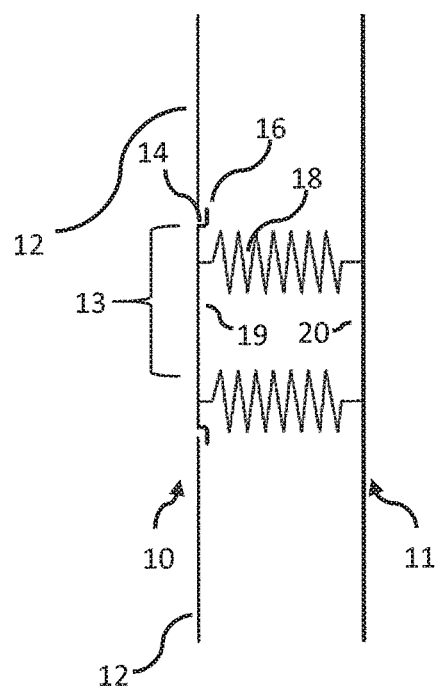
FIG. 10 shows a detail analogous to FIG. 2 according to another embodiment in a first position.
Figure 11:
FIG. 11 shows the detail according to FIG. 10 in a second position.

FIGS. 10 and 11 again show a double-walled embodiment, basically in accordance with FIGS. 4 and 5. However, in contrast to FIGS. 4 and 5, the second section 13 is not pivotable in relation to the first section 12, but is movable translationary and mounted via a spring element 18. The spring element 18 is located between an outer surface 19 of the second section 13 and an inner surface 20 of the outer wall 11. There is a delimiting section 14, but no transition section (cf. transition section 15 according to FIG. 2).

Figure 12:
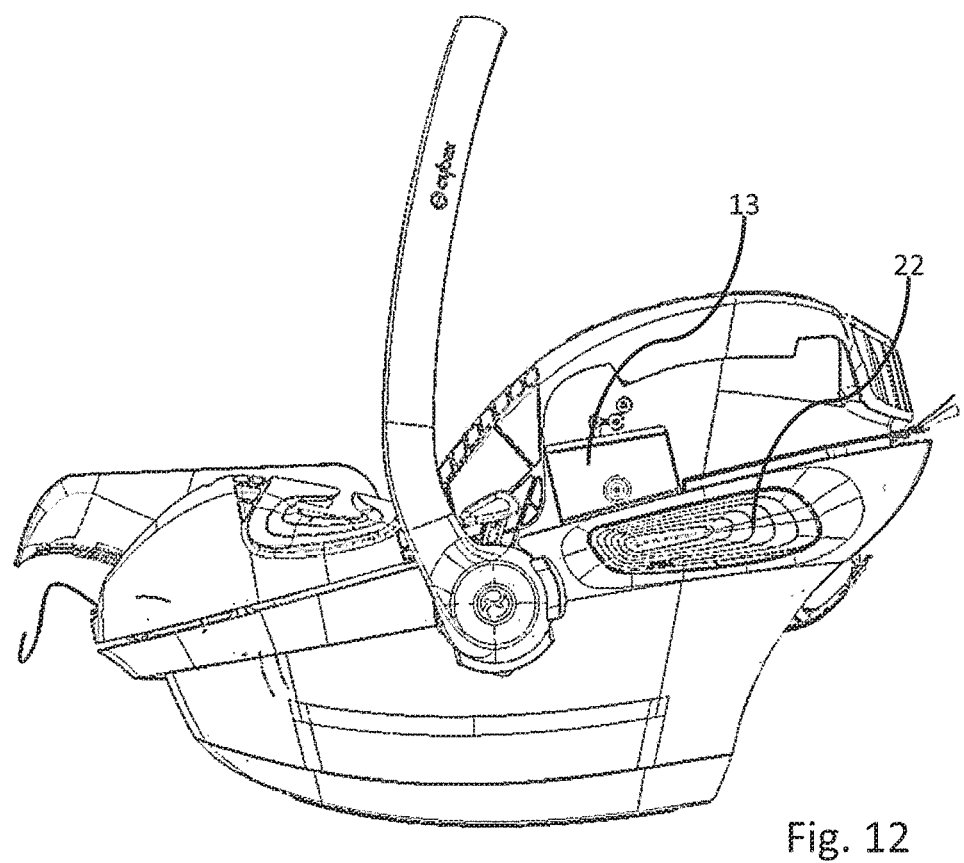
FIG. 12 shows a schematic side view of a child seat according to the invention with partially exposed interior.

FIG. 12 shows a side view of the inventive child seat (with hidden hood) including the second section 13 (or the effective area). This second section 13 has a trapezoidal geometry and tapers towards the rear. The second section 13 is shown again enlarged in FIG. 13.

Figure 13:
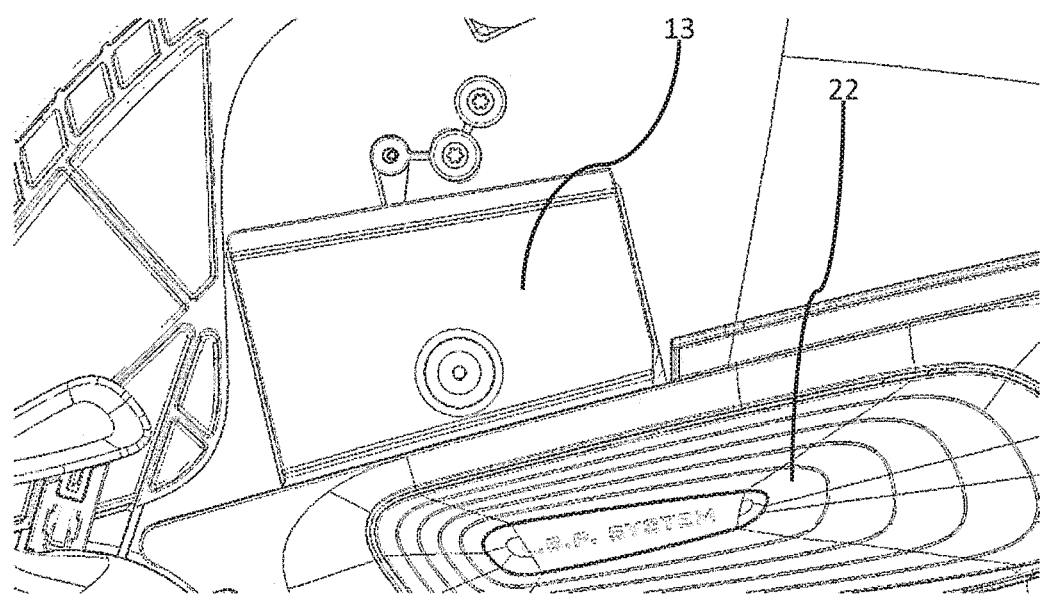
FIG. 13 shows an enlarged detail of FIG. 12.
Figure 14:
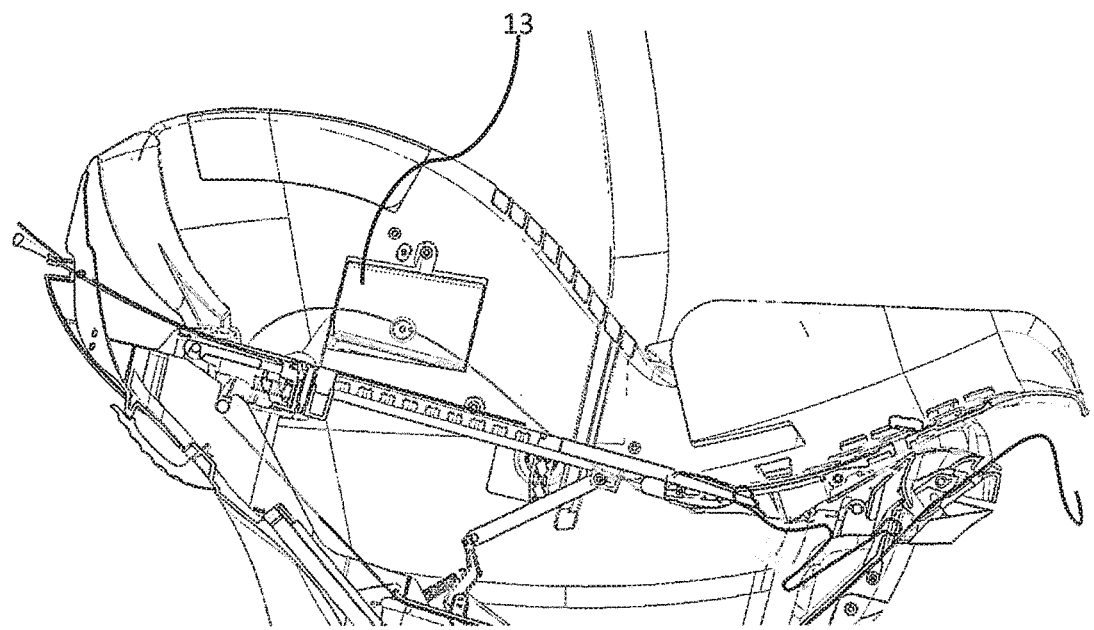
FIG. 14 shows a cross-section through the child seat according to FIGS. 12 and 13, viewing to an inner side of the second section (effective area)
Figure 15:
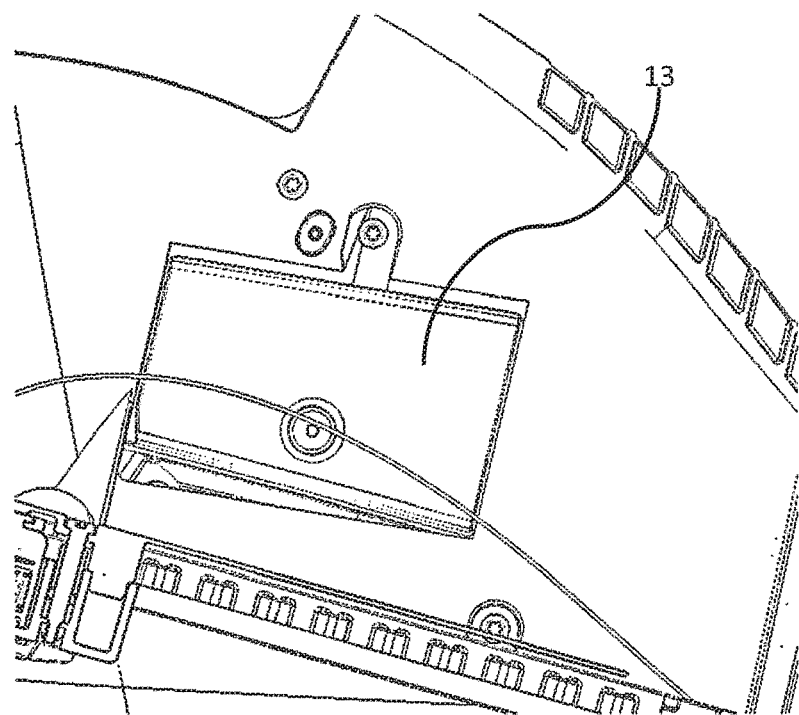
FIG. 15 shows an enlarged detail of FIG. 14.

FIG. 14 shows a section through the child seat according to FIGS. 12 and 13, viewing to an inner side of the second section 13. A corresponding enlargement of the detail around the second section 13 is shown in FIG. 15.

Figure 16:
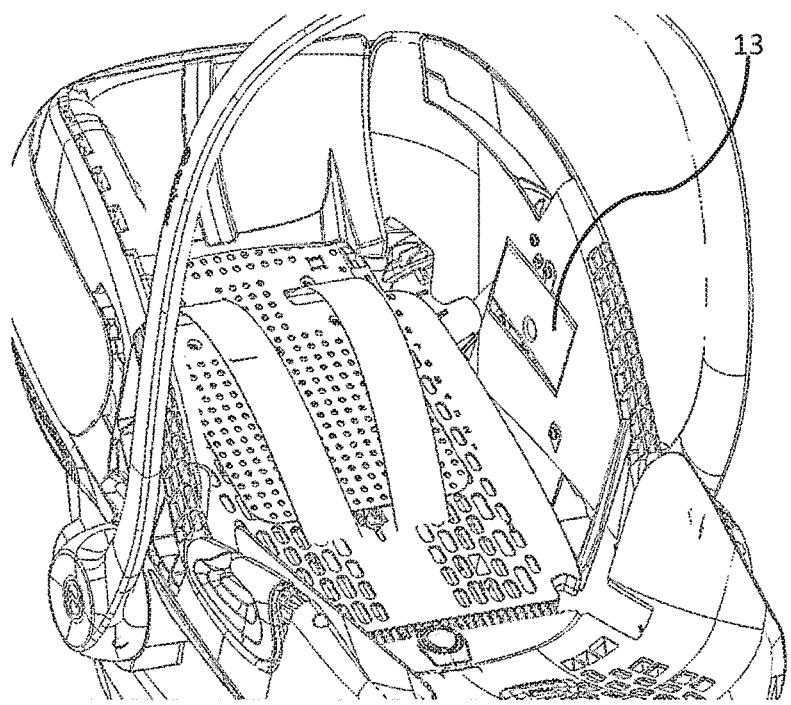
FIG. 16 shows an oblique view of the seat (with hood) viewing to the inside of the second section (effective area)

FIG. 16 shows an oblique view of the inventive child seat according to FIG. 12, now with a hood, with a view to the inside of the second section 13.

Figure 17:
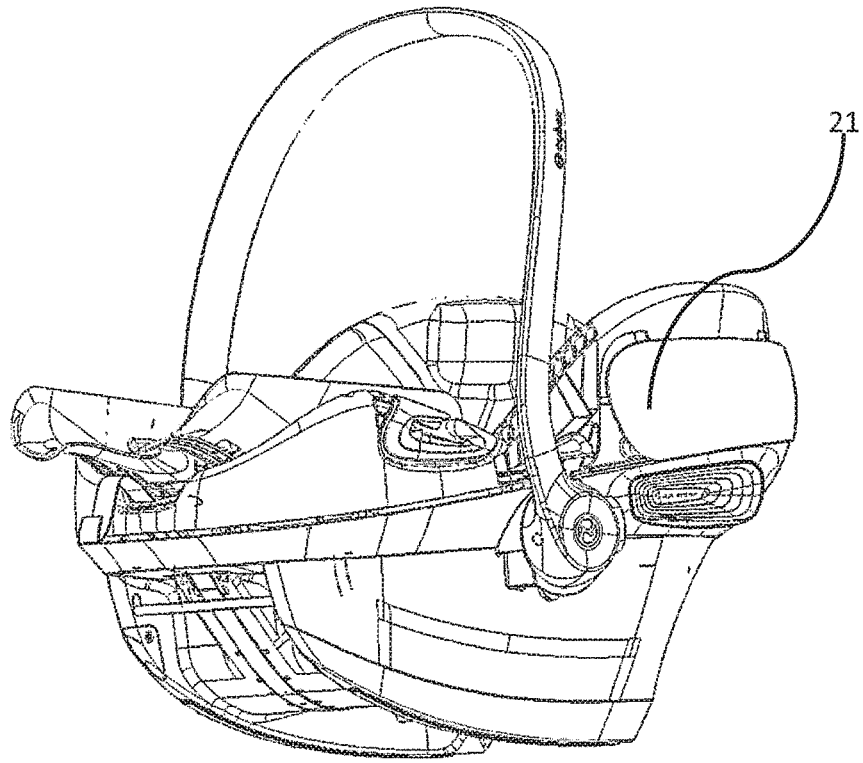
FIG. 17 shows an oblique view of the seat with hood.

FIG. 17 shows an oblique view of the seat with the second section 13 superimposed (at least to a large extent) by the top 21.

Figure 18:
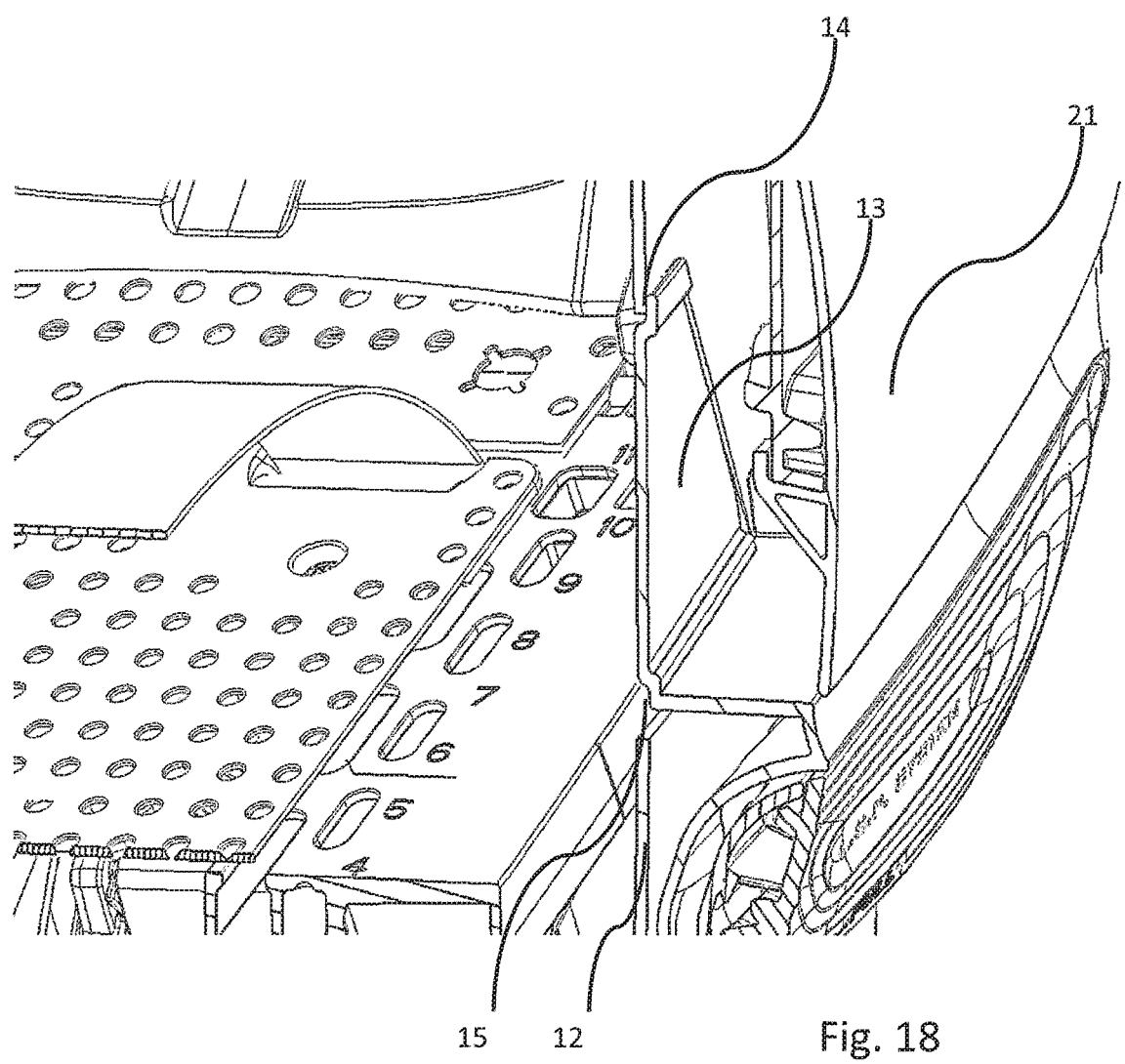
FIG. 18 shows a section through the seat (with hood).

FIG. 18 shows a section through the child seat (with hood 21) so that the position of the second section 13 in relation to hood 21 can be seen. Specifically, FIG. 18 shows that the second section 13 (upwards, to the front and rear) is bordered by a delimiting section 14 and (downwards) by a transition section 15 as a transition to the first section 12. The edge surfaces extending upwards or downwards (essentially vertically) are movable or pivotable, respectively, in relation to the remaining wall of the child seat (in particular the first section 12), just like the (upper) delimiting section 14.

In FIGS. 12-18 (see, for example, FIG. 12), a side impact protection element 22 is also shown, which can be moved (swiveled) outwards (from an outer wall of the wall of the child seat) to improve side impact protection against an external impact. In contrast to the second section 13 (the effective area), the side impact protection element 22 is arranged and configured in such a way that it is movable (at least not to a considerable extent) by the fact that the child can be moved in the direction of the contact surface (inner wall side) upon its displacement or impact. Rather, preferably a separate actuating means is provided or a separate actuation is required for its movement, which allows the child seat (for example after its mounting on the vehicle seat) to be adjusted in such a way that the side impact protection 22 is displaced outwards, for example swiveled outwards.

A fundamental conceptual difference between the side impact protection and the configuration of the second section 13 (or the damping area element) is therefore that the side impact protection 22 is already (sensibly) displaced or pivoted outwards before an impact situation (accident situation) and the third section 13 is only displaced accordingly by the impact of the child against an inner wall side of the child seat in order to damp this impact.

Second section 13 and/or side impact protection element 22 may be provided in multiple, in particular double, construction (for example, a second section 13 or a side impact protection element 22, respectively, on one side at a time).

It should be noted at this point that all parts described above, taken individually and in any combination, in particular the details shown in the drawings, are claimed to be essentially inventive. Modifications of this are familiar to the skilled person.

LIST OF REFERENCE NUMBERS

9 broken line
10 first wall
11 second wall
12 first section
13 second section
14 delimiting section
15 transition section
16 blocking device
17 wall
18 spring element
19 inner surface
20 outer surface
21 hood
22 side impact protection element

The invention claimed is:

1. A child seat for mounting on a motor vehicle seat, the seat comprising:
    at least one contact surface device for a child accommodated in the child seat,
    wherein the contact surface device comprises at least a first section and a second section,
    wherein the second section is transferable relative to the first section from a first position into a second position by the action of an at least partially outwardly directed force acting on the second section for damping a deceleration of the child, wherein the outwardly directed force is caused by a displacement of the child towards the second section, wherein in the second position, compared to the first position, a distance between at least a first border section of a border of the second section and the first section is increased, wherein the distance in the first position is less than 2 cm.

2. The child seat according to claim 1, wherein the distance in the second position being at least in sections more than 1.5 cm.

3. The child seat according to claim 1, wherein the transfer from the first position into the second position is reversible.

4. The child seat according to claim 1, wherein the second section is pivotable relative to the first section and/or is translationary movable.

5. The child seat according to claim 1, wherein the second section is designed at least in sections as a spring and/or is resiliently mounted.

6. The child seat according to claim 1, wherein the first and/or second section is/are formed from an at least substantially dimensionally stable and/or non-porous material and/or has/have a density of at least 100 kg/m$^3$, and/or has/have a thickness of at least 1 mm.

7. The child seat according to claim 1, wherein the contact surface device or at least the first and/or second section thereof is/are defined by a contact wall and/or is/are covered by a padding or other intermediate element.

8. The child seat according to claim 7, wherein the contact surface device is defined by at least one side wall and/or rear wall.

9. The child seat according to claim 1, wherein during a transfer from the first position into the second position, a distance between at least one second border section of a border of the second section and the first section remains the same and/or wherein the first section and the second section are firmly connected to one another at least in sections, or
wherein in the second position, compared to the first position, a distance between the entire border of the second section and the first section is increased.

10. The child seat according to claim 1, wherein first and second sections are structurally separated from each other at least in the first position.

11. The child seat according to claim 1, wherein the border of the second section has at least one first straight section, the first straight section permanently connected to the first section at least in sections, and/or the border of the second section, apart from the first straight section, being at least not permanently connected to the first section.

12. The child seat according to claim 1, wherein the second section is arranged: in the region from the head to the buttocks of a child accommodated in the child seat or in the region of side wings of a seat shell or the headrest.

13. The child seat according to claim 1, wherein a maximum offset between the second section and the first section is not more than 10 mm, or the second section is flush with the first section.

14. The child seat according to claim 1, wherein a blocking device is provided in such a way that a movement of the second section inwards is blocked and wherein the second section in the first position is configured to press against the blocking device by a spring.

15. The child seat according to claim 1, wherein at least one wall of the child seat is double-walled and the second section is part of an inner wall.

16. A child seat for mounting on a motor vehicle seat, the seat comprising:
at least one contact surface device for a child accommodated in the child seat,
wherein the contact surface device comprises at least a first section and a second section,
wherein the second section is transferable relative to the first section from a first position into a second position by action of an at least partially outwardly directed force acting on the second section for damping a deceleration of the child, wherein the outwardly directed force is caused by a displacement of the child towards the second section,
wherein in the second position, compared to the first position, a distance between at least a first border section of a border of the second section and the first section is increased, and
wherein the contact surface device is defined by one side wall or rear wall.

* * * * *